United States Patent [19]

Calvert et al.

[11] Patent Number: 4,642,226

[45] Date of Patent: * Feb. 10, 1987

[54] PROCESS FOR THE PREPARATION OF ZEOLITE BETA USING DIBENZYLDIMETHYLAMMONIUM IONS AND THE PRODUCT PRODUCED

[75] Inventors: Robert B. Calvert, Concord, Mass.; Clarence D. Chang, Princeton, N.J.; Mae K. Rubin, Bala Cynwyd; Ernest W. Valyocsik, Yardley, both of Pa.

[73] Assignee: Mobil Oil Corporation, New York, N.Y.

[ * ] Notice: The portion of the term of this patent subsequent to Feb. 3, 2004 has been disclaimed.

[21] Appl. No.: 717,997

[22] Filed: Mar. 29, 1985

Related U.S. Application Data

[63] Continuation-in-part of Ser. No. 684,189, Dec. 20, 1984, abandoned, which is a continuation of Ser. No. 600,682, Apr. 16, 1984, abandoned, and a continuation of Ser. No. 684,202, Dec. 20, 1984, abandoned, which is a continuation of Ser. No. 608,847, May 10, 1984, abandoned.

[51] Int. Cl.$^4$ .............................................. C01B 33/28
[52] U.S. Cl. .................................... 423/328; 423/277; 423/326; 423/329; 423/330; 423/331; 423/332; 502/60; 502/62; 502/77; 502/202

[58] Field of Search ................................ 423/326-333; 502/60, 62, 65, 66, 77

[56] References Cited

U.S. PATENT DOCUMENTS

| | | | |
|---|---|---|---|
| 3,308,069 | 3/1967 | Wadlinger et al. | 423/328 |
| 3,699,139 | 10/1972 | Rubin et al. | 423/329 X |
| 4,287,166 | 9/1981 | Dwyer et al. | 423/329 |
| 4,296,083 | 10/1981 | Rollmann | 423/329 |
| 4,552,738 | 11/1985 | Rubin | 423/328 |
| 4,585,637 | 4/1986 | Rubin | 423/328 |

OTHER PUBLICATIONS

B. M. Lok et al, *Zeolites*, 1983, vol. 3, Oct., pp. 282-291, "The Role of Organic Molecules in Molecular Sieve Synthesis".

*Primary Examiner*—John Doll
*Assistant Examiner*—Jackson Leeds
*Attorney, Agent, or Firm*—Alexander J. McKillop; Michael G. Gilman; Dennis P. Santini

[57] ABSTRACT

This invention relates to a new and improved form of crystalline silicate having the structure of zeolite Beta, to a new and useful improvement in synthesizing said crystalline silicate and to use of said crystalline silicate prepared in accordance herewith as a catalyst for organic compound, e.g. hydrocarbon compound, conversion.

14 Claims, No Drawings

PROCESS FOR THE PREPARATION OF ZEOLITE BETA USING DIBENZYLDIMETHYLAMMONIUM IONS AND THE PRODUCT PRODUCED

BACKGROUND OF THE INVENTION

1. Cross-Reference to Related Applications

This is a continuation-in-part of application Ser. No. 684,189, filed Dec. 20, 1984, which is a continuation of application Ser. No. 600,682, filed Apr. 16, 1984; and application Ser. No. 684,202, filed Dec. 20, 1984, which is a continuation of appication Ser. No. 608,847 filed May 10, 1984. All of which are now abandoned.

2. Field of the Invention

This invention relates to a new and improved form of crystalline silicate identified as zeolite Beta, to a new and useful improvement in synthesizing said crystalline silicate and to use of the crystalline silicate prepared in accordance herewith as a catalyst for organic compound, e.g. hydrocarbon compound, conversion.

More particularly, this invention relates to an improved method of preparing crystalline silicate having the structure of zeolite Beta whereby synthesis is facilitated and of reduced cost and the silicate product exhibits an extended silica/alumina range when compared to conventionally synthesized zeolite Beta.

3. Discussion of Prior Art

Crystalline zeolite Beta and its conventional preparation are taught by U.S. Pat. No. 3,308,069, the entire disclosure of which is incorporated herein by reference. It has a distinctive X-ray diffraction pattern which identifies it from other known crystalline silicates.

Applicant knows of no prior art methods for preparing crystalline zeolite Beta utilizing the present improved method.

U.S. Pat. No. 4,296,083 teaches a method for synthesis of high silica zeolites of intermediate pore size involving careful control of reaction mixture content and the presence of an organic nitrogen-containing cation source. A possible cation source is indicated to be a dibenzyldimethylammonium compound. U.S. Pat. Nos. 3,699,139 and 3,783,124 teach use of benzyltrimethylammonium ions as directing agents in synthesis of crystalline materials other than zeolite Beta. U.S. Pat. No. 3,947,482 describes a method for synthesis of open pore zeolite such as offretite by hydrothermal reaction of a silica source, alumina source, sodium hydroxide and/or potassium hydroxide in the presence of a zeolite nucleation slurry synthesized from a mixture of a silica source, alumina source, sodium hydroxide and/or potassium hydroxide and an organic template, the template potentially being a benzyltrimethylammonium compound. Zeolite ZSM-4 is shown to be synthesized in U.S. Pat. No. 4,331,643 from a reaction mixture containing as a directing agent triethylenediamine, also known as 1,4-diazabicyclo(2,2,2)octane.

SUMMARY OF THE INVENTION

An improved method for preparing an improved crystalline silicate identified as zeolite Beta exhibiting an extended product silica/alumina mole ratio range, catalytic activity and other valuable properties is provided which comprises forming a reaction mixture containing sources of alkali metal ion, an organic nitrogen-containing cation, an oxide of aluminum, an oxide of silicon and water and having a composition, in terms of mole ratios, within the following ranges:

| | Broad | Preferred |
|---|---|---|
| $SiO_2/Al_2O_3 =$ | 20–250 | 30–250 |
| $H_2O/SiO_2 =$ | 10–200 | 10–60 |
| $OH^-/SiO_2 =$ | 0.10–2.0 | 0.12–1.0 |
| $M/SiO_2 =$ | 0.05–1.0 | 0.10–0.6 |
| $R/SiO_2 =$ | 0.10–2.0 | 0.20–1.0 | wherein R is dibenzyldimethylammonium and M is an alkali metal ion, and maintaining the mixture until crystals of the crystalline zeolite Beta are formed. The quantity of $OH^-$ is calculated only from the inorganic sources of alkali without any organic base contribution. Thereafter, the crystals are separated from the liquid and recovered. Reaction conditions required consist of heating the foregoing reaction mixture to a temperature of from about 80° C. to about 175° C. for a period of time of from about 24 hours to about 120 days. A more preferred temperature range is from about 100° C. to about 160° C. with the amount of time at a temperature in such range being from about 24 hours to about 40 days.

The digestion of the gel particles is carried out until crystals form. The solid product is separated from the reaction medium, as by cooling the whole to room temperature, filtering and water washing.

EMBODIMENTS

Zeolite Beta synthesized under conventional procedure is proven to have catalytic application, but the range of product silica/alumina mole ratio is relatively limited. When the crystalline silicate is synthesized in accordance with the present method, it exhibits silica/alumina mole ratios over a wide range and significantly enhanced catalytic activity for certain conversions of interest, including hydroisomerization, cracking and low pressure hydrocracking. Further, the prior conventional reaction mixture for preparation of crystalline zeolite Beta, i.e. requiring a tetraethylammonium hydroxide directing agent, is more costly than the present invention method, especially when the chloride salt of dibenzyldimethylammonium is used as directing agent, and even more especially when the dibenzyldimethylammonium source is produced in situ, such as when dimethylbenzylamine and benzyl halide are combined in the reaction mixture to form a dibenzyldimethylammonium halide in situ. The present method allows production of relatively pure zeolite Beta.

The particular effectiveness of the presently required different organic directing agent, i.e. the dibenzyldimethylammonium, hereafter more particularly described, when compared with other directing agents, such as that identified in U.S. Pat. No. 3,308,069, is believed due to its ability to function as a template in the nucleation and growth of zeolite Beta crystals.

The reaction mixture composition for the synthesis of synthetic crystalline silicate hereby can be prepared utilizing materials which can supply the appropriate oxide. Such compositions include aluminates, alumina, silicates, silica hydrosol, silica gel, silicic acid and hydroxides. It will be understood that each oxide component utilized in the reaction mixture for preparing zeolite Beta can be supplied by one or more essential reactants and they can be mixed together in any order. For example, any oxide can be supplied by an aqueous solution, sodium hydroxide or by an aqueous solution of a suitable silicate; the organic cation can be supplied by the directing agent compound of that cation, such as, for example, the hydroxide or a salt, e.g. halide, such as chloride or bromide. The reaction mixture can be prepared either batchwise or continuously. Crystal size and crystallization time for the zeolite Beta composition will vary with the exact nature of the reaction mixture employed.

The organic directing agent required of the present method is dibenzyldimethylammonium. The source of this directing agent may be, as non-limiting examples, the hydroxide or the halide compound thereof. A preferred directing agent is the chloride salt of dibenzyldimethylammonium. Another effective source of this directing agent is the in situ reaction product of dimethylbenzylamine and benzyl halide (e.g., chloride). The molar ratio of dimethylbenzylamine to benzyl halide must be within the range of about 0.3 to about 0.6 in the reaction mixture, and preferably about 0.5. In general, the reaction mixture will comprise, when used, the dimethylbenzylamine (R'), benzyl halide (R") and alkali metal ion (M) in the molar relationship of $(R'+R'')/(R'+R''+M)=0.2$ to 1.0, preferably 0.4 to 0.8.

In the reaction mixture required of the present invention, the mole ratios of $SiO_2/Al_2O_3$ and $OH^-/SiO_2$ are critical, as is the temperature maintained during crystallization. If the $SiO_2/Al_2O_3$ mole ratio is above about 250 and/or the $OH^-/SiO_2$ mole ratio is below about 0.1, a silicate other than zeolite Beta forms as the predominant product. If the crystallization temperature is maintained above about 175° C., undesirable side products are formed. The lower temperature requirement is another cost advantage of the present process.

The zeolite Beta composition as prepared hereby can also be identified, in terms of mole ratios of oxides per 100 moles $SiO_2$ and in the anhydrous state, as follows:
(0.05 to 1.0)$R_2O$: (0.1 to 1.5)$M_{2/n}O$:(0.4 to 5)$Al_2O_3$ (100)$SiO_2$
wherein M is at least one cation having a valence n and R is dibenzyldimethylammonium, above described.

The original cations can be replaced, at least in part, by calcination and/or ion exchange with another cation. Thus, the original alkali metal form may be changed into a hydrogen or hydrogen ion precursor form or a form in which original cations have been replaced by a metal of Groups IIA, IIIA, IVA, IB, IIB, IIIB, IVB, VIB or VIII of the Periodic Table. Thus, for example, it is contemplated to exchange the original cations with ammonium ions or with hydronium ions. Catalytically active forms of these would include, in particular, hydrogen, rare earth metals, aluminum, metals of Groups II and VIII of the Periodic Table and manganese.

The X-ray diffraction patterns of crystalline silicate identified as zeolite Beta are shown in U.S. Pat. No. 3,308,069, herein incorporated by reference. It is indicated in U.S. Pat. No. 3,308,069 that appearance and disappearance of certain X-ray lines can be attributed to compositional differences in silicon to aluminum ratios in the sodium form compositions summarized in Table 2 with interplanar d-spacing (Angstroms) given in terms of intensity for several dried samples of Beta. Table 3 of U.S. Pat. No. 3,308,069 again shows X-ray diffraction lines for Beta with certain variations in intensities and line appearance attributed to cation exchange of Beta. The more significant interplanar d-spacing values for exchanged Beta appear in Table 4 of U.S. Pat. No. 3,308,069, and are as follows:

11.4±0.2
7.4±0.2
6.7±0.2
4.25±0.1
3.97±0.1
3.0±0.1
2.2±0.1

The X-ray diffraction pattern of crystalline silicate having the structure of zeolite Beta, dried at 110° C. in air, has the characteristic lines shown in Table A.

TABLE A

| Interplanar d-Spacing (A) | Relative Intensity (I/I$_o$) |
|---|---|
| 11.5 ± 0.4 | M-S |
| 7.4 ± 0.2 | W |
| 6.6 ± 0.15 | W |
| 4.15 ± 0.10 | W |
| 3.97 ± 0.10 | VS |
| 3.00 ± 0.07 | W |
| 2.05 ± 0.05 | W |

These values were determined by standard technique. The radiation was the K-alpha doublet of copper, and a diffractometer equipped with a scintillation counter and a strip chart pen recorder was used. The peak heights, I, and the positions as a function of two times theta, where theta is the Bragg angle, were read from the spectrometer chart. From these, the relative intensities, 100 I/I$_o$ where I$_o$ is the intensity of the strongest line or peak, and d (obs.), the interplanar spacing in Angstrom units (A) corresponding to the recorded lines, were calculated. In Table A the relative intensities are given in terms of the symbols W=weak, M=medium, S=strong and VS=very strong. Ion exchange of the sodium ions with cations reveals substantially the same pattern with some minor shifts in interplanar spacing and variation in relative intensity. Other minor variations can occur depending on the silicon to aluminum ratio of the particular sample, as well as if it has been subjected to thermal treatment.

While the improved crystalline silicate of the present invention may be used in a wide variety of organic compound, e.g. hydrocarbon compound, conversion reactions, it is notably useful in the processes of dewaxing, hydroisomerization, cracking and low pressure hydrocracking. Other conversion processes for which improved zeolite Beta may be utilized in one or more of its active forms include, for example, hydrocracking and converting light aliphatics to aromatics such as in U.S. Pat. No. 3,760,024.

Synthetic zeolite Beta prepared in accordance herewith can be used either in the organic nitrogen-containing and alkali metal contaning form, the alkali metal form and hydrogen form or another univalent or multivalent cationic form. It can also be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such components can be exchanged into the composition, impregnated therein or physically intimately admixed therewith. Such components can be impregnated in or on to zeolite Beta such as, for example, by, in the case of platinum, treating the zeolite with a platinum metal-containing ion. Suitable platinum compounds for this purpose include chloroplatinic acid, platinous chloride and various compounds containing the platinum amine complex. Combinations of metals and methods for their introduction can also be used.

Synthetic zeolite Beta, when employed either as an adsorbent or as a catalyst in a hydrocarbon conversion process, should be dehydrated at least partially. This can be done by heating to a temperature in the range of from about 200° C. to about 600° C. in an inert atmosphere, such as air, nitrogen, etc. and at atmospheric or subatmospheric pressures for between 1 and 48 hours. Dehydration can also be performed at lower temperature merely by placing the zeolite in a vacuum, but a longer time is required to obtain a particular degree of dehydration. The thermal decomposition product of the newly synthesized zeolite Beta can be prepared by heating same to a temperature up to about 600° C., preferably from about 200° C. to about 550° C., for from 1 hour to about 48 hours.

As above mentioned, synthetic zeolite Beta prepared in accordance herewith can have the original cations associated therewith replaced by a wide variety of other cations according to techniques well known in the art. Typical replacing cations include hydrogen, ammonium and metal cations including mixtures thereof. Of the replacing metallic cations, particular preference is given to cations of metals such as rare earths, Mn, Ca, Mg, Zn, Cd, Pd, Ni, Cu, Ti, Al, Sn, Fe and Co.

Typical ion exchange technique would be to contact the synthetic zeolite with a salt of the desired replacing cation or cations. Although a wide variety of salts can be employed, particular preference is given to chlorides, nitrates and sulfates.

Representative ion exchange techniques are disclosed in a wide variety of patents including U.S. Pat. Nos. 3,140,249; 3,140,251; and 3,140,253.

Following contact with the salt solution of the desired replacing cation, the zeolite is then preferably washed with water and dried at a temperature ranging from 65° C. to about 315° C. and thereafter may be calcined in air or other inert gas at temperatures ranging from about 200° C. to about 600° C., preferably from about 200° C. to about 550° C., for periods of time ranging from 1 to 48 hours or more to produce a catalytically-active thermal decomposition product thereof.

Regardless of the cation replacing the alkali metal in the synthesized form of the zeolite Beta, the spatial arrangement of the aluminum, silicon and oxygen atoms which form the basic crystal lattices of zeolite Beta remains essentially unchanged by the described replacement of alkali metal as determined by taking an X-ray powder diffraction pattern of the ion-exchanged material.

The crystalline silicate prepared by the instant invention is formed in a wide variety of particle sizes. Generally speaking, the particles can be in the form of a powder, a granule, or a molded product, such as extrudate having particle size sufficient to pass through a 2 mesh (Tyler) screen and be retained on a 400 mesh (Tyler) screen. In cases where the catalyst is molded, such as by extrusion, the crystalline silicate can be extruded before drying or dried or partially dried and then extruded.

In the case of many catalysts, it is desired to incorporate the zeolite Beta hereby prepared with another material resistant to the temperatures and other conditions employed in certain organic conversion processes. Such matrix materials include active and inactive materials and synthetic or naturally occurring zeolites as well as inorganic materials such as clays, silica and/or metal oxides, e.g. alumina. The latter may be either naturally occurring or in the form of gelatinous precipitates, sols or gels including mixtures of silica and metal oxides. Use of a material in conjuction with the zeolite Beta, i.e. combined therewith, which is active, may enhance the conversion and/or selectivity of the catalyst in certain organic conversion processes. Inactive materials suitably serve as diluents to control the amount of conversion in a given process so that products can be obtained economically and orderly without employing other means for controlling the rate or reaction. Frequently, crystalline silicate materials have been incorporated into naturally occurring clays, e.g. bentonite and kaolin. These materials, i.e. clays, oxides, etc., function, in part, as binders for the catalyst. It is desirable to provide a catalyst having good crush strength, because in a petroleum refinery the catalyst is often subjected to rough handling, which tends to break the catalyst down into powder-like materials which cause problems in processing.

Naturally occurring clays which can be composited with the hereby synthesized zeolite Beta include the montmorillonite and kaolin families which include the subbentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the zeolite Beta catalyst hereby synthesized can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components could also be used. The relative proportions of finely divided crystalline silicate and matrix vary widely with the crystalline silicate content ranging from about 1 to about 90 percent by weight, and more usually in the range of about 2 to about 50 percent by weight of the composite.

Employing a catalytically active form of the composition of this invention containing a hydrogenation component, reforming stocks can be reformed employing a temperature between 370° C. and 540° C. The pressure can be between 100 and 1000 psig, but is preferably between 200 and 700 psig. The liquid hourly space velocity is generally between 0.1 and 10 $hr^{-1}$, preferably between 0.5 and 4 $hr^{-1}$ and the hydrogen to hydrocarbon mole ratio is generally between 1 and 20, preferably between 4 and 12.

The catalyst can also be used for hydroisomerization of normal paraffins, when provided with a hydrogenation component, e.g. platinum. Hydroisomerization is carried out at a temperature between 90° C. to 370° C., preferably 140° C. to 290° C., with a liquid hourly space velocity between 0.01 and 2 $hr^{-1}$, preferably between 0.25 and 0.50 $hr^{-1}$, employing hydrogen such that the hydrogen to hydrocarbon mole ratio is between 1 and 5. Additionally, the catalyst can be used for olefin or aromatics isomerization employing temperatures between 0° C. and 370° C.

The catalyst can also be used for reducing the pour point of gas oils. This process is carried out at a liquid hourly space velocity between about 10 and about 30 hr$^{-1}$ and a temperature between about 400° C. and about 540° C.

Other reactions which can be accomplished employing the catalyst of this invention containing a metal, e.g. platinum, include hydrogenation-dehydrogenation reactions and desulfurization reactions, olefin polymerization (oligomerization), and other organic compound conversions such as the conversion of alcohols (e.g. methanol) to hydrocarbons.

In order to more fully illustrate the nature of the invention and the manner of practicing same, the following examples are presented. In the examples, whenever adsorption data are set forth for comparison of sorptive capacities for water, cyclohexane and n-hexane, they were determined as follows:

A weighed sample of the calcined adsorbant was contacted with the desired pure adsorbate vapor in an adsorption chamber, evacuated to 1 mm and contacted with 12 mm Hg of water vapor or 40 mm Hg of n-hexane, or cyclohexane vapor, pressures less than the vapor-liquid equilibrium pressure of the respective adsorbate at room temperature. The pressure was kept constant (within about ±0.5 mm) by addition of adsorbate vapor controlled by a manostat during the adsorption period, which did not exceed about 8 hours. As adsorbate was adsorbed by the sorbant material, the decrease in pressure caused the monostat to open a valve which admitted more adsorbate vapor to the chamber to restore the above control pressures. Sorption was complete when the pressure change was not sufficient to activate the monostat. The increase in weight was calculated as the adsorption capacity of the sample in g/100 g of calcined adsorbant.

EXAMPLE 1

A 1 gram quantity of $NaAlO_2$ (0.012 mole) and 5.4 grams NaOH (0.135 mole) were dissolved in 100 ml distilled water. The resulting solution was mixed with a solution of 65.4 grams dibenzyldimethylammonium chloride in 250 ml distilled water. To this mixture was added 80 grams of colloidal dispersion of 30 wt. % $SiO_2$ (Ludox) with agitation.

The reaction mixture composition of this example in terms of mole ratios was as follows:

$SiO_2/Al_2O_3 = 102$
$H_2O/SiO_2 = 23$
$OH^-/SiO_2 = 0.34$
$Na^+/SiO_2 = 0.18$
$R/SiO_2 = 0.62$

The resulting gel was stirred viorously for 10 minutes, and then heated to reflux (about 98° C.) with stirring at 100 rpm for 30

The resulting crystalline product was filtered from the reaction liquid, washed with water, and then dried at about 110° C. X-ray analysis proved the product crystals to be zeolite Beta.

EXAMPLE 2

The experiment of Example 1 repeated with dibenzyldimethylammonium hydroxide as the directing agent in place of the chloride salt provides a crystalline product having a characteristic X-ray diffraction pattern of zeolite Beta.

EXAMPLE 3

A solution of 0.42 gram of sodium aluminate (43.3% $Al_2O_3$ and 32.2% $Na_2O$), 2.0 grams of NaOH and 20.0 grams of water was added to 90.0 grams of colloidal silica (30% solution). To this was then added 5.7 grams of dimethylbenzylamine and 5.5 grams of benzyl chloride. The total was then thorouqhly mixed. The mixture, which had the composition in mole ratios:

$SiO_2/Al_2O_3$ = about 250 (i.e. 252)
$OH^-/SiO_2 = 0.12$
$H_2O/SiO_2 = 10.18$
$(R'+R'')/(R'+R''+Na) = 0.61$ wherein R' is dimethylbenzylamine and R'' is benzyl chloride, was then allowed to crystallize in a glass-lined stainless steel autoclave at 125° C. for 21 days. The product crystals were separated from the remaining mixture, filtered, washed with water and dried at 135° C.

The crystalline product was submitted for chemical analysis and X-ray diffraction analysis. Chemical analysis proved the composition of the product crystals to be as follows:

10.7 wt. %: C
0.90 wt. %: N
0.14 wt. %: Na
0.83 wt. %: $Al_2O_3$
83.4 wt. %: $SiO_2$
86.7 wt. %: Ash
171: $SiO_2/Al_2O_3$ molar ratio X-ray results indicated crystalline zeolite Beta, with a trace of non-Beta crystalline material.

A quantity of the product of this example was calcined at 550° C. for 16 hrs. in air, and then tested for sorption properties. The results indicated:

9.6 wt. % cyclohexane sorbed,
8.1 wt. % n-hexane sorbed, and
11.3 wt. % water sorbed.

EXAMPLE 4

A solution of 0.46 gram of sodium aluminate (43.3% $Al_2O_3$ and 32.2% $Na_2O$), 2.48 grams of NaOH and 161.0 grams of water was added to 36.8 grams of colloidal silica (30% solution). To this was then added 15.5 grams of dimethylbenzylamine and 14.5 grams of benzyl chloride. The total was then mixed thoroughly. The mixture, which had the composition in mole ratios:

$SiO_2/Al_2O_3 = 92.3$
$OH^-/SiO_2 = 0.37$
$H_2O/SiO_2 = 57.35$
$(R'+R'')/(R'+R''+Na) = 0.77$ wherein R' is dimethylbenzylamine and R'' is benzyl chloride, was then allowed to crystallize in a polypropylene jar under static conditions at 100° C. for 35 days. The product crystals were separated from the remaining mixture, filtered, washed with water and dried at 135° C.

The crystalline product was submitted for chemical analysis and X-ray diffraction analysis. Chemical analysis proved the composition of the product crystals to be as follows:

0.11 wt. %: Na
1.9 wt. %: $Al_2O_3$
72.7 wt. %: $SiO_2$
75.3 wt. %: Ash
65.1: $SiO_2/Al_2O_3$ molar ratio Table B indicates the X-ray diffraction pattern of the crystalline product of this example. The crystals were dried at 110° C. in air prior to X-ray analysis.

TABLE B

| Interplanar d-Spacings (A) | Observed 2 × Theta | Relative Intensities, I/I$_o$ |
|---|---|---|
| 11.87 | 7.45 | M-S |
| 4.20 | 21.15 | W |
| 3.99 | 22.30 | VS |
| 3.03 | 29.50 | W |
| 2.09 | 43.38 | W |

These X-ray results indicate a 60% crystalline zeolite Beta.

A quantity of the product of this example was calcined at 540° C. for 16 hrs. in air, and then tested for sorption properties. The results indicated:
22.4 wt. % cyclohexane sorbed,
17.2 wt. % n-hexane sorbed, and
25.5 wt. % water sorbed.

EXAMPLE 5

A solution of 0.74 gram of sodium aluminate (43.3% Al$_2$O$_3$ and 32.2% Na$_2$O), 30 grams of NaOH and 116 grams of water was added to 80.0 grams of colloidal silica (30% solution). To this was then added 9.93 grams of dimethylbenzylamine and 9.3 grams of benzyl chloride. The total was then thoroughly mixed. The mixture, which had the composition in mole ratios:

SiO$_2$/Al$_2$O$_3$=127
OH$^-$/SiO$_2$=0.22
H$_2$O/SiO$_2$=23.98
(R'+R'')/(R'+R''+Na)=0.63 wherein R' is dimethylbenzylamine and R'' is benzyl chloride, was then allowed to crystalize in a polypropylene jar under static conditions at 100° C. for 115 days. The product crystals were separated from the remaining mixture, filtered, washed with water and dried at 135° C.

The crystalline product was submitted for chemical analysis and X-ray diffraction analysis. Chemical analysis showed the following results:
1.3 wt. %: Al$_2$O$_3$
74.9 wt. %: SiO$_2$
97.9: SiO$_2$/Al$_2$O$_3$ molar ratio The X-ray results indicated a 55% crystalline zeolite Beta with a minor amount of non-Beta crystalline material.

What is claimed is:

1. A method for synthesizing a crystalline silicate consisting essentially of one having the structure of zeolite Beta which comprises (i) preparing a reaction mixture capable of forming said crystalline silicate, said mixture comprising sources of alkali metal ions (M), dibenzyldimethylammonium ions (R), an oxide of silicon, water and an oxide of aluminum and having a composition, in terms of mole ratios, within the following ranges:

SiO$_2$/Al$_2$O$_3$=20-250
H$_2$O/SiO$_2$=10-200
OH/SiO$_2$=0.10-2.0
M/SiO$_2$=0.05-1.0
R/SiO$_2$=0.10-2.0, (ii) maintaining the reaction mixture at conditions sufficient to crystallize said silicate, including a temperature of from about 80° C. to about 175° C., and (iii) recovering said crystalline silicate from step (ii), said recovered crystalline silicate containing dibenzyldimethylammonium and alkali metal.

2. The method of claim 1 wherein said reaction mixture has a composition, in terms of mole ratios, as follows:

SiO$_2$/Al$_2$O$_3$=30-250
H$_2$O/SiO$_2$=10-60
OH/SiO$_2$=0.12-1.0
M/SiO$_2$=0.10-0.6
R/SiO$_2$=0.20-1.0

3. The method of claim 1 wherein said source of dibenzyldimethylammonium is a dibenzyldimethylammonium compound selected from the group consisting of the halide and hydroxide.

4. The method of claim 3 wherein said compound is the halide.

5. The method of claim 4 wherein said halide is chloride.

6. A crystalline silicate having the structure of zeolite Beta and containing dibenzyldimethylammonium and alkali metal synthesized by a method which comprises (i) preparing a reaction mixture capable of forming said crystalline silicate, said mixture comprising sources of alkali metal ions (M), dibenzyldimethylammonium ions (R), an oxide of silicon, water and an oxide of aluminum and having a composition in terms of mole ratios as follows:

SiO$_2$/Al$_2$O$_3$=20-250
H$_2$O/SiO$_2$=10-200
OH/SiO$_2$=0.10-2.0
M/SiO$_2$=0.05-1.0
R/SiO$_2$=0.10-2.0, (ii) maintaining the reaction mixture at conditions sufficient to crystallize said silicate, and (iii) recovering said crystalline silicate from step (ii), said recovered crysalline silicate containing dibenzyldimethylammonium and alkali metal.

7. The synthetic crystalline silicate of claim 6 wherein said source of dibenzyldimethylammonium is a dibenzyldimethylammonium compound selected from the group consisting of halide and hydroxide.

8. The synthetic crystalline silicate of claim 7 wherein said compound is the halide.

9. The synthetic crystalline silicate of claim 6 wherein M is sodium.

10. The method of claim 1 comprising replacing alkali metal ions of the crystalline silicate recovered in step (ii), at least in part, by ion exchange with a cation or a mixture of cations selected from the group consisting of hydrogen and hydrogen precursors, rare earth metals, and metals from Groups IIA, IIIA, IVA, IB, IIB, IIIB, IVB, VIB and VIII of the Periodic Table of Elements.

11. The method of claim 10 wherein said replacing cation is hydrogen or a hydrogen precursor.

12. Dibenzyldimethylammonium-containing zeolite Beta.

13. The dibenzyldimethylammonium-containing product crystalline silicate of claim 10.

14. The dibenzyldimethylammonium-containing product crystalline silicate of claim 11.

* * * * *